(12) United States Patent
De Cesaris et al.

(10) Patent No.: US 11,282,494 B2
(45) Date of Patent: Mar. 22, 2022

(54) METHOD FOR GENERATING AN AUDIO SIGNAL, IN PARTICULAR FOR ACTIVE CONTROL OF THE SOUND OF THE ENGINE OF A LAND VEHICLE, AND CORRESPONDING APPARATUS (71) Applicant: Marelli Europe S.p.A., Corbetta (IT)

(72) Inventors: Simona De Cesaris, Corbetta (IT); Saverio Armeni, Corbetta (IT); Walter Nesci, Corbetta (IT)

(73) Assignee: MARELLI EUROPE S.p.A., Corbetta (IT)

( * ) Notice: Subject to any disclaimer, the term of this patent is extended or adjusted under 35 U.S.C. 154(b) by 0 days.

(21) Appl. No.: 17/259,873

(22) PCT Filed: Jul. 11, 2019

(86) PCT No.: PCT/IB2019/055910
§ 371 (c)(1),
(2) Date: Jan. 13, 2021

(87) PCT Pub. No.: WO2020/012397
PCT Pub. Date: Jan. 16, 2020

(65) Prior Publication Data
US 2021/0280163 A1    Sep. 9, 2021

(30) Foreign Application Priority Data

Jul. 13, 2018  (IT) .................. 102018000007193

(51) Int. Cl.
*G10K 15/02*    (2006.01)
*G10L 25/18*    (2013.01)
(Continued)

(52) U.S. Cl.
CPC .............. *G10K 15/02* (2013.01); *G10L 25/18* (2013.01); *G10L 25/51* (2013.01); *H04R 1/025* (2013.01);
(Continued)

(58) Field of Classification Search
None
See application file for complete search history.

(56) References Cited

U.S. PATENT DOCUMENTS

| 5,119,425 A | 6/1992 | Rosenstrach et al. |
| 2005/0113168 A1 | 5/2005 | Maeda |

(Continued)

FOREIGN PATENT DOCUMENTS

| GB | 2351634 A | 1/2001 |
| JP | H07302093 A | 11/1995 |
| JP | 2000010576 A | 1/2000 |

OTHER PUBLICATIONS

International Search Report and Written Opinion of the International Searching Authority for PCT International Application No. PCT/IB2019/055910 dated Nov. 18, 2019.

*Primary Examiner* — Paul W Huber
(74) *Attorney, Agent, or Firm* — Howard & Howard Attorneys PLLC (57) ABSTRACT

A method for generating an audio signal representing the dynamic state of a land vehicle as a function of the value of at least one first parameter comprises the steps of receiving an input audio signal and dividing the input audio signal into a set of audio frames of given duration; selecting, an audio frame representing the input audio signal; subdividing the selected audio frame into a set of audio sub-frames; determining a probability of transition between orderly pairs of the audio sub-frames and synthesizing the audio signal representing the dynamic state of a land vehicle by generating a sequence of audio sub-frames; computing a centre (Continued)

frequency of the selected audio frame and carrying out a frequency shift of the centre frequency as a function of the centre frequency of the selected audio frame and of the value of at least one first parameter that indicates the dynamic state of the vehicle, thereby generating a frequency-shifted subsequent audio sub-frame.

13 Claims, 3 Drawing Sheets

(51) Int. Cl.
    *G10L 25/51*     (2013.01)
    *H04R 1/02*     (2006.01)
    *H04R 1/40*     (2006.01)
    *H04R 3/12*     (2006.01)
    *B60Q 5/00*     (2006.01)

(52) U.S. Cl.
    CPC .............. *H04R 1/403* (2013.01); *H04R 3/12* (2013.01); *B60Q 5/008* (2013.01); *H04R 2430/01* (2013.01); *H04R 2499/13* (2013.01)

(56) References Cited

U.S. PATENT DOCUMENTS

| | | |
|---|---|---|
| 2009/0048841 A1 | 2/2009 | Pollet et al. |
| 2011/0087403 A1 | 4/2011 | Fujikawa |
| 2015/0353007 A1 | 12/2015 | Inoue et al. |
| 2018/0277135 A1* | 9/2018 | Ali ...................... G10L 21/0216 |
| 2019/0049989 A1* | 2/2019 | Akotkar ............... G05D 1/0255 |
| 2019/0206384 A1 | 7/2019 | De Cesaris et al. |

* cited by examiner

METHOD FOR GENERATING AN AUDIO SIGNAL, IN PARTICULAR FOR ACTIVE CONTROL OF THE SOUND OF THE ENGINE OF A LAND VEHICLE, AND CORRESPONDING APPARATUS

CROSS-REFERENCE TO RELATED APPLICATIONS

The present application is a National Stage of International Patent Application No. PCT/IB2019/055910, filed on Jul. 11, 2019, which claims priority to and all the benefits of Italian Patent Application No. 102018000007193, filed on Jul. 13, 2018, both of which are hereby expressly incorporated herein by reference in their entirety.

BACKGROUND OF THE INVENTION

1. Field of the Invention

The present disclosure relates to techniques for generating an audio signal representing the dynamic state of a land vehicle as a function of the value of at least one parameter that indicates the dynamic state of the land vehicle and on the basis of an input audio signal.

One or more embodiments may be applied, for example, to methods and apparatuses for active control of the sound of the engine of a land vehicle that comprise using the aforesaid generated audio signal as driving audio signal for one or more acoustic actuators provided in the land vehicle so as to reproduce the sound of the engine represented by the aforesaid audio signal generated, in particular to methods and apparatuses for generating synthetic sounds in hybrid vehicles (HY) and/or electric vehicles (EL).

2. Description of the Related Art

The quality of the sounds perceived by users inside and/or outside land vehicles, for example passenger vehicles such as cars, is a characteristic that is becoming increasingly important in the design of the aforesaid vehicles.

Providing users with high-quality acoustic experiences is important in vehicles provided with internal-combustion engine (ICE), but also in hybrid vehicles (HY) and electric vehicles (EL).

In the case of hybrid or electric vehicles, the sound produced by the vehicle outside the vehicle itself must also meet some standards that impose the need for a vehicle to produce, when it moves at low speed, a sound that will cause alert or in any case will be audible by users in its vicinity.

In all types of land vehicles mentioned previously (ICE, HY, EL) electro-acoustic devices can be used for reproducing certain sounds, inside and/or outside the passenger compartment. Such synthetic sounds produced via electro-acoustic devices can modify the sound "naturally" produced by the vehicle and/or generate sounds additional to the ones produced by the engine or by other parts of the vehicle (for example, by the members for transmission of motion, by the gas-exhaust system, etc.).

For instance, an electro-acoustic device installed on board a vehicle provided with internal-combustion engine can be configured for generating sounds that are consistent with the sound produced naturally by the vehicle that is moving and/or by the internal-combustion engine.

Such sounds generated by an electro-acoustic device in a vehicle provided with internal-combustion engine may be designed for the purpose of reducing or emphasizing certain characteristics of the sound of the vehicle, for example to emphasize the sound of the engine and/or of the gas-exhaust system to increase the sensation of driving a sports car.

An electro-acoustic device installed on board a vehicle provided with internal-combustion engine (ICE) or on board a hybrid vehicle (HY) can produce synthetic sounds generated as composition of one or more "engine orders" (corresponding to sinusoidal waves, or pure tones), the aforesaid synthetic sounds being correlated to a parameter that indicates the dynamic state of the aforesaid land vehicle, such as the engine speed or r.p.m. or else the speed of movement of the vehicle, but also the state and/or position of the accelerator pedal (for example, pressed to a certain percentage), the engine torque, and/or the state of the engine. For instance, the state of the engine may be identified simply by the ON/OFF values, or else in a more sophisticated way may coincide with a given operating condition, such as a condition of traction, a condition of regeneration, a condition of braking, or a condition of coasting, etc.

The aforesaid synthetic sounds, possibly obtained as combination of engine orders, can be modified in order to obtain a certain psycho-acoustic effect in users. For instance, techniques of combination and processing of acoustic signals corresponding to engine orders are described in the Italian patent application No. 102017000149307, filed on Dec. 22, 2017 by the present applicant.

In the case of hybrid vehicles, the characteristics of the sounds generated by electro-acoustic devices installed on board such vehicles should be similar to the ones described previously in relation to vehicles equipped with internal combustion engines, to be used when the internal-combustion engine is active, and preferably integrate an additional sound profile to be used in the condition of (completely) electric drive, to be used when the internal-combustion engine is inactive. The sounds generated according to the aforesaid additional sound profile should combine characteristics of the natural sound coming from the internal-combustion engine with other synthetic characteristics.

In the case of electric vehicles, a different scenario may be envisioned. In fact, electric vehicles produce sounds, the characteristics of which are not (markedly) correlated to the state of the vehicle and/or to the driving conditions, contrary to what occurs in vehicles provided with internal-combustion engines.

Moreover, the sound produced by a land vehicle of any type: Internal Combustion Engine, Hybrid or Electric (ICE, HY, or EL), must be evaluated in relation to the typical ambient noise, which can be relatively high in the case of environments such as roads or streets, especially if they are busy. Hence, the sound produced by electric vehicles, which is usually of an intensity lower than that produced by ICE or hybrid vehicles, could prove almost inaudible in normal conditions.

Hence, designing and defining the sounds generated by electric vehicles may be problematical for vehicle manufacturers. For instance, meeting the requisites of the standards in this field may prove problematical.

In addition, it may be desirable to design the aforesaid sounds generated by electric vehicles with the aim of conserving, or defining ex novo, typical sounds recognisable by users, capable of identifying the brand of the vehicle, for example by introducing "attractive" characteristics of sound that can be associated by users to a particular car manufacturer.

SUMMARY OF THE INVENTION

Notwithstanding the extensive activity in the field, improved solutions are desirable.

For instance, solutions are desirable that can facilitate generation of synthetic sounds, some characteristics of which (for example, the spectral characteristics and/or amplitude characteristics) can be modified as a function of the value of one or more control signals.

Furthermore, solutions are desirable that will enable generation of the aforesaid synthetic sounds with characteristics that depending upon the dynamic state of a vehicle. For this purpose, the values of the aforementioned control signals may depend upon some quantities that define the dynamic state of a vehicle, such as the engine speed or r.p.m. or the vehicle speed.

An object of one or more embodiments is to contribute to providing the aforesaid improved solutions.

According to one or more embodiments, the aforesaid object can be achieved by a method having the characteristics set forth in the ensuing claims.

One or more embodiments may refer to a corresponding apparatus.

The claims form an integral part of the technical teaching provided herein in relation to the embodiments.

In brief, one or more embodiments refer to a method for generating an audio signal representing the dynamic state of a land vehicle as a function of the value of at least one first parameter that indicates the dynamic state of the vehicle and on the basis of an input audio signal.

In one embodiment, the method comprises the steps of: receiving an input audio signal and dividing the input audio signal into a set of audio frames of given duration; selecting an audio frame representing the input audio signal in the aforesaid set of audio frames; subdividing the selected audio frame into a set of audio sub-frames of given duration; determining probabilities of transition between orderly pairs of audio sub-frames, preferably of all the possible orderly pairs of audio sub-frames; and synthesizing the audio signal representing the dynamic state of the land vehicle by generating a sequence of audio sub-frames, each subsequent audio sub-frame in the sequence being selected as a function of the current audio sub-frame and of the transition probability associated thereto.

In one embodiment, the method further comprises computing a centre frequency of the frequency spectrum of the selected audio frame, and the aforesaid operation of synthesizing the audio signal representing the dynamic state of a land vehicle further comprises carrying out a frequency, or pitch, shift of the centre frequency of the subsequent audio sub-frame as a function of the centre frequency of the frequency spectrum of the selected audio frame and of the value of the aforesaid at least one first parameter that indicates the dynamic state of the land vehicle, thereby generating a frequency-shifted subsequent audio sub-frame.

The centre frequency of the frequency spectrum of the selected audio frame may be computed, for example, in terms of spectral centroid of the selected audio frame.

In one or more embodiments, the at least one first parameter that indicates the dynamic state of the land vehicle comprises one between the speed or r.p.m. of the vehicle engine and the vehicle speed, and carrying out a frequency, or pitch, shift of the centre frequency of the subsequent audio sub-frame, thereby generating a frequency-shifted subsequent audio sub-frame, comprises: receiving the value of the at least one first parameter that indicates the dynamic state of the land vehicle and determining a characteristic frequency as a function of the value of the at least one first parameter; determining a frequency scale factor between the aforementioned characteristic frequency and the centre frequency of the frequency spectrum of the selected audio frame; and applying the frequency scale factor to the frequency spectrum of the subsequent audio sub-frame, thereby generating a frequency-shifted subsequent audio sub-frame.

In an alternative embodiment, carrying out a frequency shift of the centre frequency of the subsequent audio sub-frame comprises the steps of: receiving the value of the at least one first parameter that indicates the dynamic state of the land vehicle; associating a frequency scale factor to the value of the at least one first parameter as a function of a configurable map; and applying the frequency scale factor to the frequency spectrum of the subsequent audio sub-frame, thereby generating a frequency-shifted subsequent audio sub-frame.

In one or more embodiments, the method comprises applying to the frequency-shifted subsequent audio sub-frame at least one amplitude gain as a function of the value of a second parameter that indicates the dynamic state of the land vehicle.

In one or more embodiments, the second parameter that indicates the dynamic state of the land vehicle may comprise at least one from among the engine speed or r.p.m. of the land vehicle, the speed of the land vehicle, the position of an accelerator pedal of the land vehicle, the engine torque of the land vehicle, and the state of the engine of the land vehicle.

In one or more embodiments, the at least one amplitude gain is a function of the value of the second parameter that indicates the dynamic state of the land vehicle according to a configurable map.

In one or more embodiments, the operation of selecting, in a set of audio frames, an audio frame representing the input audio signal comprises computing, as a function of the values of at least one characteristic quantity computed for the input audio signal and for each of the audio frames, a measurement of similarity between each of the audio frames in the set of audio frames and the input audio signal, and selecting the selected audio frame in the of audio frames as a function of the measurement of similarity between each of the audio frames and the input audio signal.

In one or more embodiments, the operation of determining probabilities of transition between orderly pairs of audio sub-frames (preferably of all the possible orderly pairs of audio sub-frames) comprises computing, as a function of the values of at least one characteristic quantity computed for the audio sub-frames (preferably, for each audio sub-frame), a measurement of similarity between orderly pairs of audio sub-frames (preferably, of all the possible orderly pairs of audio sub-frames), and determining probabilities of transition between pairs of audio sub-frames as a function of the measurements of similarity between audio sub-frames of pairs of audio sub-frames.

In one or more embodiments, the method comprises modifying the spectral characteristics and/or amplitude characteristics of the audio signal representing the dynamic state of a land vehicle as a function of at least one from among the state of the engine of the land vehicle, the state of the land vehicle, the conditions external to the land vehicle, the location of the land vehicle, and the schedule of use of the land vehicle.

In one or more embodiments, the method comprises receiving different input audio signals and/or selecting each subsequent audio sub-frame in the sequence as a function of the current audio sub-frame and of the transition probability associated thereto according to different selection rules, as a function of at least one from among the state of the engine of the land vehicle, the state of the land vehicle, the conditions external to the land vehicle, the location of the land vehicle, and the schedule of use of the land vehicle.

In one or more embodiments, a method for active control of the sound of the engine of a land vehicle may comprise using the audio signal representing the dynamic state of a land vehicle generated by a method according to one or more embodiments as driving audio signal for driving one or more acoustic actuators provided in the land vehicle so as to reproduce the sound of the engine represented by the audio signal.

One or more embodiments may regard an apparatus for active control of the sound of a land vehicle that comprises at least one processor that generates an audio signal representing the dynamic state of the land vehicle by applying a method according to one or more embodiments and for using the audio signal representing the dynamic state of the land vehicle as driving audio signal for driving one or more acoustic actuators provided in the land vehicle so as to reproduce the sound of the engine represented by the aforesaid audio signal.

In a variant embodiment, the above apparatus may be characterized in that the vehicle comprises a plurality of acoustic actuators, and the at least one processor modulates differently the driving audio signal according to the acoustic actuator to which it is sent.

BRIEF DESCRIPTION OF THE DRAWINGS

Other advantages of the invention will be readily appreciated as the same becomes better understood by reference to the following detailed description when considered in connection with the accompanying drawings, wherein.

DETAILED DESCRIPTION OF THE INVENTION

In the ensuing description, one or more specific details are illustrated, aimed at providing an in-depth understanding of examples of embodiments of this description. The embodiments may be provided without one or more of the specific details, or with other methods, components, materials, etc. In other cases, known structures, materials, or operations are not illustrated or described in detail so that certain aspects of the embodiments will not be obscured.

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment", "in one embodiment", or the like that may be present in one or more points of the present description do not necessarily refer to one and the same embodiment.

Moreover, particular conformations, structures, or characteristics may be combined in any appropriate way in one or more embodiments.

The references used herein are provided merely for convenience and consequently do not define the sphere of protection or the scope of the embodiments.

In summary, the present invention is directed toward a method and an apparatus for active control of the sound of an (electric) land vehicle that can receive as input signal an audio signal, which may be arbitrary, and reproduce an output signal in a way consistent with the state of the vehicle and/or driving condition.

The solution described herein envisages operating on the aforesaid input signal using an audio-texture procedure, by synthesizing an audio sequence, or stream, on the basis of a given standard audio signal.

In the aforesaid context, it is envisaged that an input audio signal, i.e., a standard signal, of possibly short duration, will be supplied at input to generate at output a smooth sound of arbitrary length, the aforesaid output sound being correlated to the dynamic behaviour of the vehicle in real time.

According to the solution described herein, it is hence envisaged to apply the aforesaid audio-texture procedure, in particular, as explained in greater detail below, via the operations of receiving the aforesaid input audio signal and dividing is into a set of audio frames of given duration; selecting, in the said set of audio frames, an audio frame representing the input audio signal; subdividing said selected audio frame into a set of audio sub-frames of given duration; determining a probability of transition within each orderly pair of said audio sub-frames; and synthesizing the audio signal representing the dynamic state of a land vehicle by generating a sequence of the aforesaid audio sub-frames, each subsequent audio sub-frame in said sequence being selected as a function of the current audio sub-frame and of the transition probabilities associated thereto.

Figure 1:
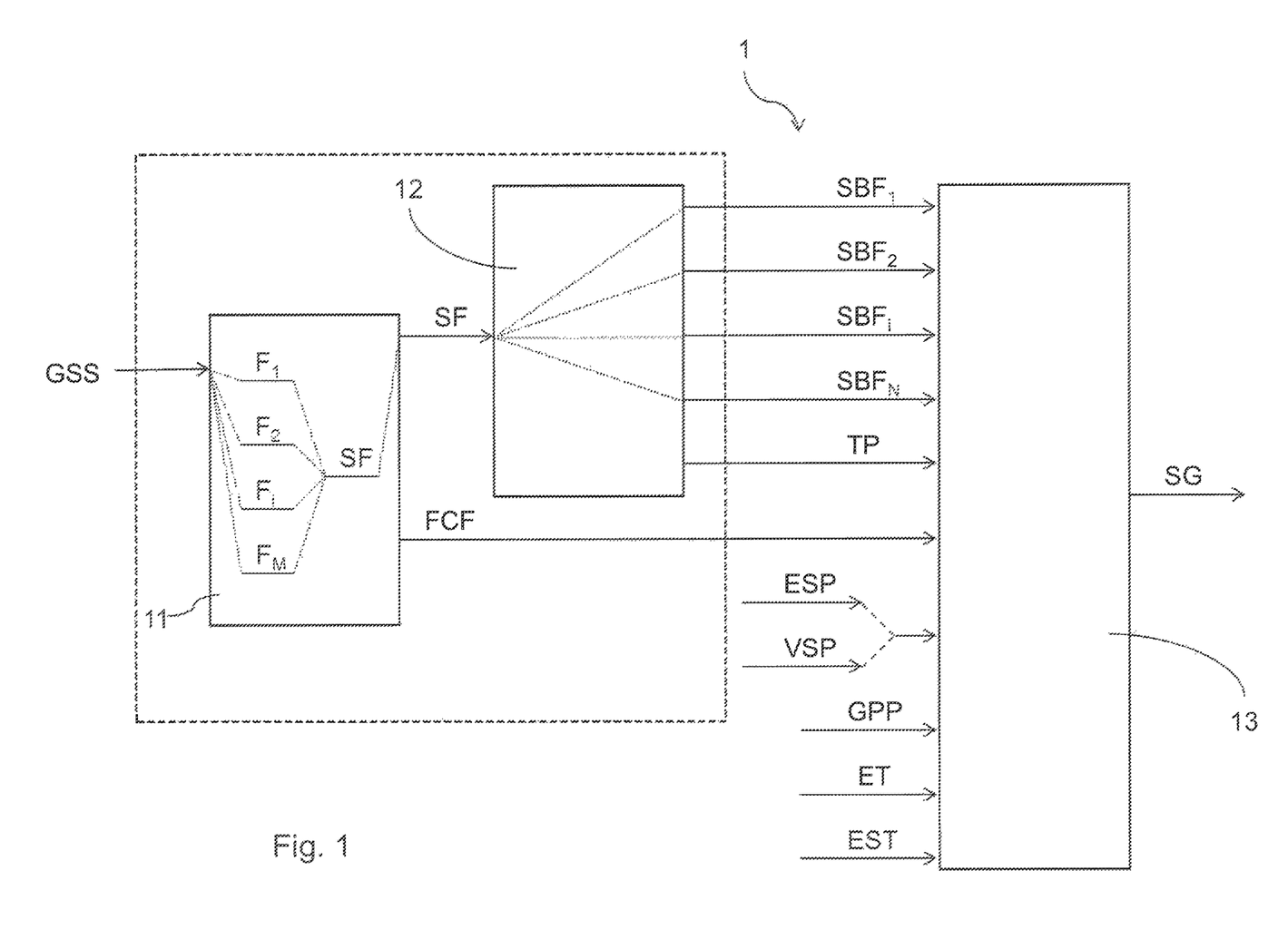
FIG. 1 is a block diagram exemplifying embodiments.

In this context, FIG. 1 illustrates a principle diagram of an apparatus for active control of the sound of a land vehicle, for example an electric vehicle, designated as a whole by the reference number 1. The components and modules comprised in the aforesaid apparatus 1 are electronic modules that exchange signals, in particular electrical signals, and can be implemented via one or more processor modules, which may even be comprised in one or more vehicle electronic control units, such as the ECU (Engine Control Unit), the Head Unit (Infotainment Module), and/or electronic modules of a DSP (Digital Signal Processing) type, or microcontrollers.

The aforesaid apparatus 1 is divided into in three main processing modules, designated by the reference numbers 11, 12, 13.

Each of the aforesaid modules 11, 12, 13 is configured for carrying out a step of a corresponding method for generating a synthetic sound or driving audio signal.

The module 11 for selection of an audio frame is configured for selecting, starting from an arbitrary audio track GSS at input coming from a generic source, an audio frame SF that will be processed by the apparatus for active control of the sound 1. This arbitrary input audio track GSS in general corresponds to an audio signal, in particular in the time domain, whereas the audio frame SF corresponds to a segment or time interval of the arbitrary input audio track GSS.

The duration of the above selected audio frame SF may mainly depend upon the storage and/or processing capacity of the electronic devices that implement the processing modules 11, 12, 13.

The module 12 for generation of sub-frames is configured for analysing the selected audio frame SF, supplied at output by the module 11, and divide the aforesaid selected audio frame SF into a number N of sub-frames $SBF_1$, $SBF_2$, ..., $SBF_N$ of given duration.

The above number N of sub-frames may be chosen, for example, as a function of the total duration of the selected audio frame SF and/or of the storage and/or calculation capacity of the electronic devices that implement the processing modules 11, 12, 13.

The module 13 for generation of the output audio signal is configured for synthesizing the driving audio signal SG to be produced at output by reproducing in a certain order the sub-frames $SBF_1, SBF_2, \ldots, SBF_N$ supplied by the module 12 and processing these sub-frames $SBF_1, SBF_2, \ldots, SBF_N$ in order to render the spectral and/or amplitude characteristics thereof consistent with the state of the vehicle, the state of the engine, and/or the driving conditions.

Of the three modules 11, 12, and 13, only the module 13 for generation of the output audio signal presents stringent constraints of real-time operation, whereas the modules 11 and 12 (included in the rectangle drawn with a dashed line in FIG. 1) can carry out the corresponding processing operations in off-line mode or on-line mode, but without any constraints of real-time operation.

In one or more embodiments, via the operations of processing of audio signals implemented in the processing modules 11 and 12, characteristic quantities are extracted, which represent the audio data at input to the respective processing modules.

The aforesaid input audio data correspond to the audio signal GSS supplied at input to the module 11 in a first step of the method, and to the selected audio frame SF supplied at output from the module 11 to the module 12 in a second step of the method.

In addition, in one or more embodiments, characteristic quantities are also extracted, which represent audio data generated by the respective processing modules.

Both for the processing operations implemented in the module 11 and for those implemented in the module 12, the characteristic quantities extracted from the audio signals GSS, SF, and SBF may comprise mel-frequency cepstral coefficients (MFCCs), linear predictive coding (LPC), correlograms, or other characteristics.

In a first step of the method for generating a synthetic sound, implemented in the module 11 of FIG. 1, an input audio signal GSS coming from an arbitrary source is analysed in order to extract one or more of the characteristic quantities thereof listed previously, for example MFCCs.

In addition, the input audio signal GSS is divided into a number M of successive audio frames $F_1, F_2, \ldots, F_M$ of given duration. As anticipated, the aforesaid duration may be chosen as a function of the storage and/or processing capacity of the electronic devices that implement the modules 11, 12.

As for the input audio signal GSS, also for each of the audio frames $F_1, F_2, \ldots, F_M$, one or more of the characteristic quantities listed previously, for example MFCCs, are computed via processing in the module 11.

Once again via processing in the module 11, a measurement of similarity is computed, for example a similarity index, between each of the M audio frames $F_1, F_2, \ldots, F_M$ of given duration and the input audio signal GSS, as a function of the characteristic quantity or quantities extracted for the input audio signal GSS and for each of the audio frames $F_1, F_2, \ldots, F_M$.

The aforesaid measurement of similarity may be expressed, for example, by a real number, such as a correlation coefficient.

The above measurements of similarity calculated enable determination of which of the aforesaid frames $F_1, F_2, \ldots, F_M$ is the most representative of the audio signal GSS and can hence be selected for being supplied at output from the module 11.

Consequently, the frame SF with the highest computed measurement of similarity to the input audio signal GSS from among the frames $F_1, F_2, \ldots, F_M$ is selected and supplied at output from the module 11 to the module 12.

Moreover, the processing module 11 is also configured for computing a frame centre frequency FCF of the acoustic spectrum of the aforesaid selected frame SF, for example for computing it as a spectral centroid of the aforesaid selected frame SF.

The selected frame SF and the corresponding frame centre frequency FCF represent the outputs of the module for selection of an audio frame 11, which implements a first step of the method for generating a driving audio signal SG according to one or more embodiments.

In a second step of the aforesaid method, implemented in the module 12 for generation of sub-frames, the selected audio frame SF supplied at output from the module 11 is subdivided into in a number N of audio sub-frames $SBF_1, SBF_2, \ldots, SBF_N$ of a duration shorter than or equal to the duration of the selected audio frame SF. If the number N is greater than 1, the module 12 for generation of sub-frames is configured to divide the selected audio frame SF into a set of audio sub-frames $SBF_1, SBF_2, \ldots, SBF_N$ of given duration, comprising a plurality of sub-frames.

Of course, in the limit case where the number N of audio sub-frames is equal to 1, the duration of the audio sub-frames is equal to the duration of the selected audio frame SF. In this case, no subdivision of the selected audio frame SF is made, and the audio signal representing the dynamic state of a land vehicle is synthesised by generating a repeated sequence of the selected audio frame SF.

In a way similar to what has been described for the first step of the method, also for each of the audio sub-frames $SBF_1, SBF_2, \ldots, SBF_N$ at least one of the characteristic quantities described previously is computed, for example MFCCs.

It will be noted that in general the aforesaid characteristic quantity computed for the audio sub-frames $SBF_1, SBF_2, \ldots, SBF_N$ may be different from the characteristic quantity computed for the audio frames $F_1, F_2, \ldots, F_M$. On the other hand, in a preferred embodiment, the characteristic quantity computed for the audio sub-frames is the same characteristic quantity as the one computed for the audio frames, thus determining an overall simplification of the method for processing the audio signals.

Moreover, measurements of similarity between the sub-frames are calculated, for example one measurement of similarity for each pair of audio sub-frames $SBF_1, SBF_2, \ldots, SBF_N$, once again as a function of the characteristic quantity or quantities computed for each of the audio sub-frames $SBF_1, SBF_2, \ldots, SBF_N$.

Unlike the first step of the method, regarding processing of the frame, the second step of the method envisages an additional step of processing of the sub-frames $SBF_1, SBF_2, \ldots, SBF_N$.

In this additional step, probabilities of transition TP between sub-frames are computed, for example one transition probability for each orderly pair of audio sub-frames $SBF_1, SBF_2, \ldots, SBF_N$.

The aforesaid transition probabilities TP may be calculated, for example, as a function of the measurements of similarity computed previously between pairs of audio sub-frames $SBF_1, SBF_2, \ldots, SBF_N$.

The transition probabilities TP are useful for defining a possible order, or sequence, of reproduction of the audio sub-frames $SBF_1, SBF_2, \ldots, SBF_N$ in a third step of the method, implemented in the module 13, for generating a certain driving audio signal SG.

In fact, in a third step of the method, the audio sub-frames $SBF_1, SBF_2, \ldots, SBF_N$ are selected, modified in real time as a function of some signals that indicate the dynamic state of the vehicle, and reproduced in a certain sequence according to a certain rule of ordering.

If no rule for determining the order of reproduction of the aforesaid sub-frames $SBF_1, SBF_2, \ldots, SBF_N$ is defined in the third step of the method, the sub-frames are reproduced in the same order with which they are extracted from the original frame SF.

It will on the other hand be noted that the same result would be obtained if the rule for determining the order of reproduction of the sub-frames $SBF_1, SBF_2, \ldots, SBF_N$ were a simple rule of the most probable sub-frame, i.e., a rule such that, at the end of each sub-frame, the sub-frame that has the highest transition probability associated is reproduced because the sub-frame having the highest probability of transition with respect to the current sub-frame is (reasonably) always the immediately following sub-frame, by virtue of its greatest similarity to the current sub-frame. In practice, given any current sub-frame $SBF_i$, the transition with the highest probability is usually the transition towards the immediately following sub-frame $SBF_{i+1}$.

In the case described above, i.e., in the case where a rule of ordering for the reproduction of the audio sub-frames $SBF_1, SBF_2, \ldots, SBF_N$ is not defined or the rule, if defined, coincides with the choice of the most probable sub-frame, the driving audio signal SG generated at output from the apparatus 1 is highly likely to be a complete repetition of the selected frame SF at input to the module 12 (albeit with characteristics of frequency and/or amplitude modified as a function of some signals that indicate the dynamic state of the vehicle).

Even though the spectral characteristics of the driving audio signal SG generated at output from the apparatus 1 are modified, instant by instant (or in real time), as a function of the instantaneous dynamic behaviour of the vehicle, the periodic reproduction of one and the same frame SF may result in generation of sound artefacts that can adversely affect the quality of the generated sound perceived by users.

Consequently, the transition probabilities TP computed in the module 12 in a second step of the method are used in the subsequent step following upon definition of a rule of ordering of the sub-frames $SBF_1, SBF_2, \ldots, SBF_N$ that is based upon the values of the aforesaid transition probabilities TP.

The set of sub-frames $SBF_1, SBF_2, \ldots, SBF_N$ and the corresponding transition probabilities TP represent the outputs of the second step of the method, implemented in the module 12 for generation of sub-frames.

A third step of the method is implemented in the module 13 for generation of the output audio signal.

Figure 2:
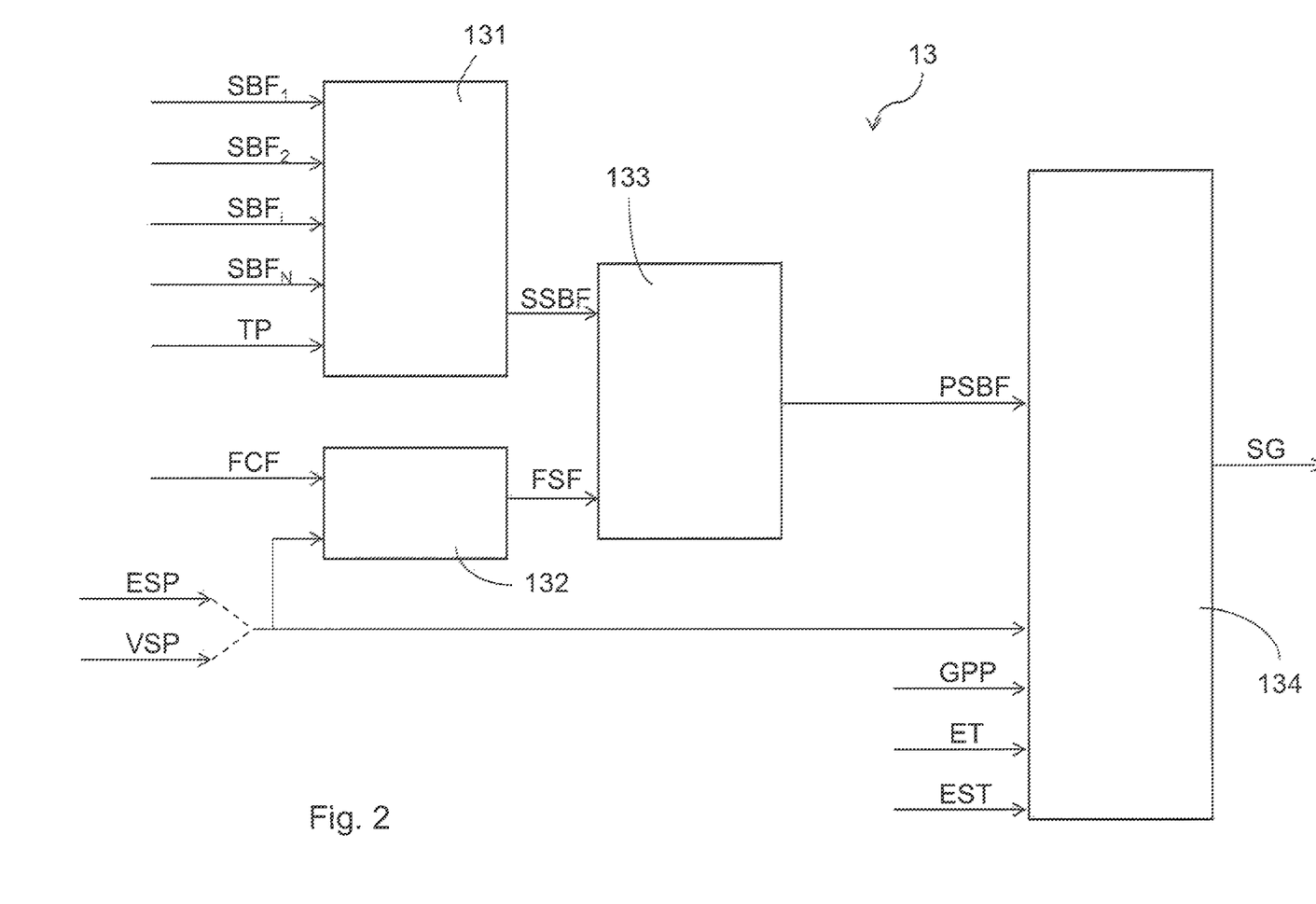
FIG. 2 is a block diagram exemplifying possible details of implementation of embodiments.

FIG. 2 illustrates a principle diagram of a possible implementation of the above processing module 13, which comprises some sub-modules 131, 132, 133, 134.

The processing module 13 receives at input the set of sub-frames $SBF_1, SBF_2, \ldots, SBF_N$ and the transition probabilities TP associated thereto supplied by the module 12, the frame centre frequency FCF of the acoustic spectrum of the selected frame SF supplied by the module 11, and signals indicating the values of some parameters of the vehicle, such as the engine speed or r.p.m. ESP, the vehicle speed VSP, the position of the accelerator pedal GPP, the engine torque ET, and the engine state EST.

Via processing of audio signals in the module 13, a driving audio signal SG is synthesized starting from a concatenation of sub-frames $SBF_1, SBF_2, \ldots, SBF_N$, the order of reproduction of which is determined by a certain ordering rule based upon the transition probabilities TP associated thereto.

Moreover, the frequency spectrum of the aforesaid driving audio signal SG is varied as a function of the engine speed ESP and/or of the vehicle speed VSP.

In a preferred embodiment, the amplitude of the driving audio signal SG at output can be varied as a function of a gain that depends upon at least one of the following parameters: engine speed ESP, vehicle speed VSP, position of the accelerator pedal GPP, and engine torque ET.

Optionally, different sound profiles can be applied to the driving audio signal SG as a function of the engine state EST, and/or of the state of the vehicle, and/or of the external conditions.

The above different sound profiles can be identified as pre-defined sound configurations, or tuning, that have an effect on the driving audio signal SG and/or on other parameters, such as the input audio signal GSS.

For instance, different sound profiles may be such as to create a different volume of the driving audio signal SG, or else a different sound print of the driving audio signal SG, for example obtained by selecting a different input audio track GSS, or else by imposing a different rule of ordering of the sub-frames.

Consider by way of example the possibility of applying different sound profiles according to the vehicle speed (whether moderate as in the case of urban driving, or sustained as in the case of driving on a motorway), or else according to the geographical location of the vehicle (for example, limiting the intensity of the sound emissions in the proximity of protected areas, such as schools or hospitals), or else again according to the schedule, envisaging a different processing of the audio signals according to whether the vehicle is used during daytime or night-time.

Processing of audio signals implemented in the processing module 13 hence comprises a plurality of steps, amongst which selection of a sub-frame in block 131, calculation of a frequency scale factor in block 132, a frequency (or pitch) shifting in block 133, and composition of sub-frames in block 134.

Block 131, illustrated in FIG. 2, receives at input the sub-frames $SBF_1, SBF_2, \ldots, SBF_N$ and the transition probabilities TP computed in the module 12 and determines what is the next sub-frame SSBF that is to be reproduced as a function of the sub-frame currently being reproduced and of the transition probability associated thereto.

In order to prevent, as anticipated, sound loops and/or the periodic repetition of a restricted subset of sub-frames from among the sub-frames $SBF_1, SBF_2, \ldots, SBF_N$ (given that the most probable transitions are usually the ones between consecutive sub-frames), a rule of selection of the next sub-frame SSBF is defined.

Given a certain current sub-frame, the aforesaid rule of selection imposes that the next sub-frame in the sequence of reproduction is randomly chosen from among the sub-frames $SBF_1, SBF_2, \ldots, SBF_N$ with the exclusion of the i sub-frames "closest" to the current one (to the left and to the right), where i is an integer that can vary in a given range, the range of variability of the integer i being possibly a function of the ratio between the duration of the frame SF and the duration of the sub-frames SBF.

In a similar way, the aforesaid range of variability may be function of the number N of sub-frames $SBF_1, SBF_2, \ldots, SBF_N$.

It will be noted that the expression "closest sub-frames", used previously, is meant to indicate the sub-frames that are closest to the current one in order of time, both the previous ones and the subsequent ones.

Block 132, illustrated in FIG. 2, receives at input the frame centre frequency FCF of the acoustic spectrum of the selected frame SF supplied by the module 11, and one between the value of engine speed ESP and the value of vehicle speed VSP, in order to determine a frequency scale factor FSF.

It will be noted that the parameter to be used to determine a frequency scale factor FSF, namely the engine speed ESP or the vehicle speed VSP, may be fixed, for example determined on the basis of the type of vehicle on which the system is installed, or else configurable, for example selectable by the user.

In one or more embodiments, by dividing the value of the engine speed ESP expressed in r.p.m. (revolutions per minute) by the factor 60 a characteristic frequency of the engine can be obtained, and the frequency scale factor FSF can be determined as the ratio between the aforesaid characteristic frequency of the engine and the frame centre frequency FCF of the acoustic spectrum of the selected frame SF.

In alternative embodiments, the values of the frequency scale factor FSF can be mapped as a function of a generic input quantity, such as the vehicle speed VSP. This mapping enables association of an output value of the frequency scale factor FSF to each possible value of an input quantity via a correspondence map (for example, a look-up table), this map being possibly configurable, for example via in-field calibration.

Block 133, illustrated in FIG. 2, receives at input the sub-frame SSBF selected in block 131 and the frequency scale factor FSF computed in block 132, to carry out a frequency, or pitch, shift of the aforesaid sub-frame SSBF and generate a modified, i.e., pitch-shifted, sub-frame PSBF.

Consequently, the frequency spectrum of the sub-frame PSBF at output from block 133 is obtained via pitch-shifting. For instance, pitch-shifting can be carried out using re-sampling techniques, where the frequency scale factor FSF is used as re-sampling factor.

Block 134, illustrated in FIG. 2, receives at input the modified sub-frame PSBF generated in block 133 and at least one parameter that indicates the operating conditions of the vehicle selected from among engine speed ESP or vehicle speed VSP, position of the accelerator pedal GPP, engine torque ET, and a signal indicating the engine state EST, and generates the driving audio signal SG via concatenation of the sub-frames received from block 133, and appropriately processed.

To the modified sub-frame PSBF it is in fact possible to apply (block 134) the amplitude gains as a function of at least one of the following: engine speed ESP, vehicle speed VSP, position of the accelerator pedal GPP, engine torque ET, and engine state EST.

It will be noted that different configurable maps can be defined to establishing a correspondence between the possible values of different input quantities, such as engine speed ESP, vehicle speed VSP, position of the accelerator pedal GPP, and engine torque ET, and the corresponding values of the gains applied to the modified sub-frame PSBF. These maps, which associate output values to possible input values, can be configured, for example, via calibration during testing on the actual product.

Moreover, a smoothing filter is applied to the sequence of sub-frames processed, which constitutes the driving audio signal SG in order to eliminate any sharp variations of the sound signal between the end of one sub-frame and the start of the next.

Via the procedure described herein, the steps of which are implemented by the modules 11, 12, 13 (in a concentrated or distributed form), an apparatus for active control of the sound of a land vehicle enables complete design of the sound OS produced by an electric vehicle, generating a "captivating" output sound both inside and outside of the passenger compartment.

The aforesaid sound can be produced using an electro-acoustic device that generates a synthetic sound OS, inside and/or outside a vehicle, the electro-acoustic device being driven by a driving signal SG generated according to the method implemented by an apparatus for active control of the sound of a land vehicle, as described herein.

The aforesaid output sound OS can be defined freely since there are no constraints on the characteristics of the sound source that can be used for obtaining the audio signal GSS at input to the apparatus 1.

The above audio signal GSS may represent an ambient sound, such as the sound of rain, of a hurricane, of the wind, or a cinematographic sound effect, or any other sound.

Of course, the audio signal GSS may be a signal representing the sound of an engine, for example an internal-combustion engine, in the case where the aim is to reproduce the sound of an internal-combustion engine on an electric vehicle.

Moreover, the driving audio signal SG at output from the apparatus 1 is also such as to be correlated to the engine state, the engine speed, the vehicle speed, the position of the accelerator pedal, and/or engine torque.

It will moreover be noted that such an apparatus 1 can be implemented as software code in a dedicated electronic control unit (ECU) inside a vehicle, or else in the infotainment system already present in the vehicle, or else again in any other electronic control unit present in the vehicle that is provided with an power audio output or in any case with an audio output line, it thus being possible to implement a solution completely integrated in a vehicle.

Figure 3:
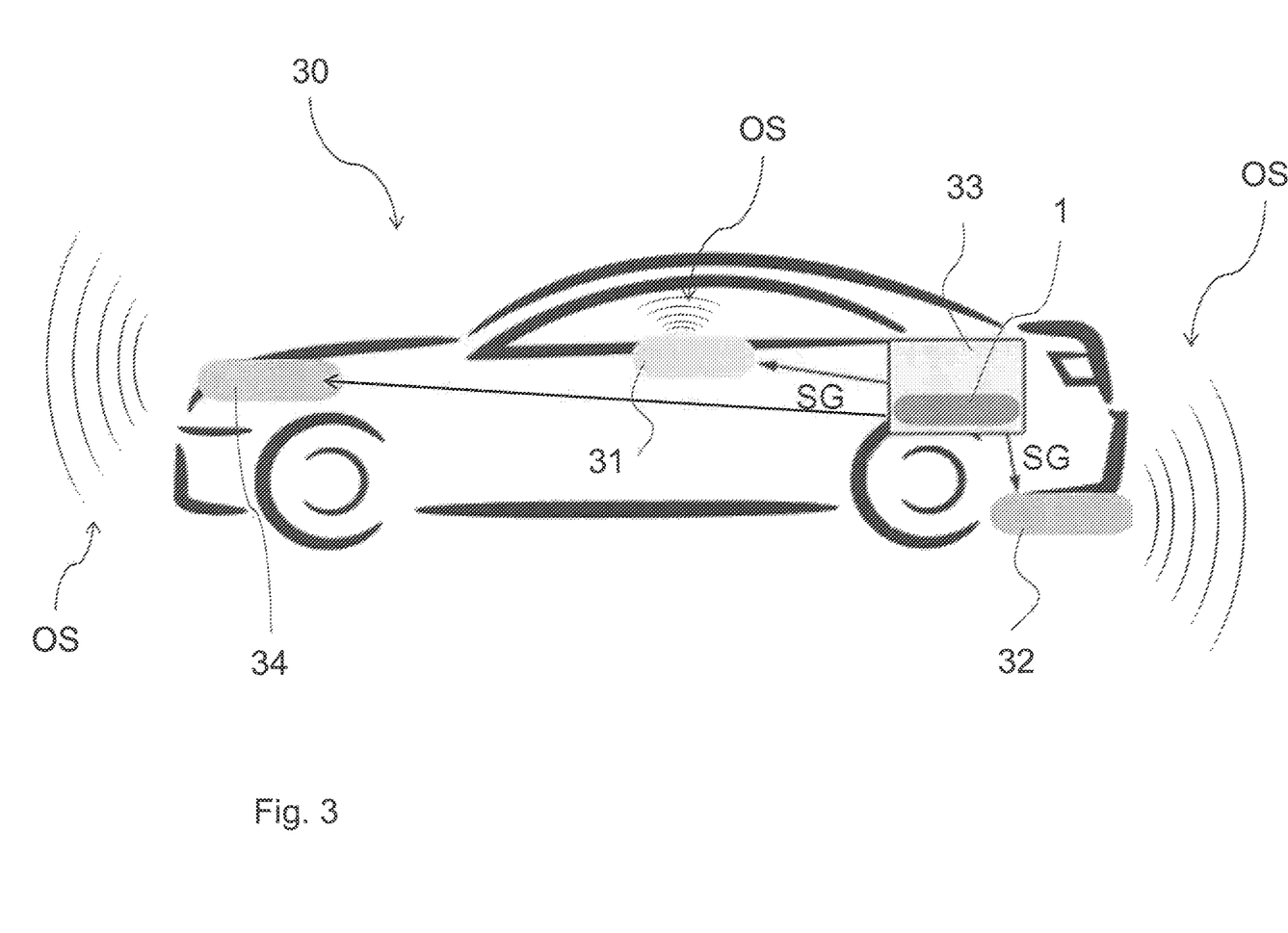
FIG. 3 exemplifies a possible context of use of embodiments.

FIG. 3 illustrates an example of installation of the apparatus 1 that is implemented via software in an ECU 33 of a motor vehicle 30 and drives via a driving signal SG both an acoustic actuator 31 in the passenger compartment of the motor vehicle 30 and an acoustic actuator 32 in the outer rear part of the motor vehicle, as well as an acoustic actuator 34 in the outer front part of the motor vehicle. These acoustic actuators 31, 32, 34 may, for example, be speakers or shakers for emitting the sound OS of the vehicle.

Of course, the number and arrangement of the acoustic actuators provided in the vehicle 30 and driven by a driving audio signal SG may vary with respect to what has been illustrated herein purely by way of example.

For instance, in the case of an electric vehicle without gas-exhaust terminals, an acoustic actuator 32 in the outer rear part of the motor vehicle can be installed in an area different from the one illustrated by way of example in FIG. 3. For instance, an acoustic actuator 32 may be installed in the area of the back lights of the motor vehicle 30.

In variant embodiments, the driving audio signal SG can be modulated differently according to the acoustic actuator to which it is sent, and also the actuators in one and the same context, for example, in the passenger compartment, can receive different driving audio signals SG; for example, the right-hand speaker in the passenger compartment may receive a driving audio signal different form the one received by the left-hand speaker in the passenger compartment.

It will be noted that a pure tone (for example, a sinusoidal audio signal), as likewise a composition of pure tones, can be considered as a simple audio texture, and consequently is suited to being processed according to the method as described herein for supplying a certain driving audio signal SG.

Consequently, one or more embodiments may be used not only in the case of electric vehicles but also in the case of hybrid vehicles or vehicles provided with an internal-combustion engine, for example by using an audio texture made up of pure tones corresponding to the engine orders.

Without prejudice to the underlying principles, the details and embodiments may vary even considerably with respect to what has been described herein exclusively by way of example, without departing from the sphere of protection, which is defined in the annexed claims. Thus, the invention has been described in an illustrative manner. It is to be understood that the terminology which has been used is intended to be in the nature of words of description rather than of limitation. Many modifications and variations of the invention are possible in light of the above teachings. Therefore, within the scope of the appended claims, the invention may be practiced other than as specifically described.

The invention claimed is:

1. A method for generating an audio signal (SG) representing a dynamic state of a land vehicle as a function of a value of at least one first parameter (ESP, VSP) that indicates the dynamic state of said land vehicle and on the basis of an input audio signal,
    said method comprising the steps of:
    receiving an input audio signal (GSS) and dividing said input audio signal (GSS) into a set of audio frames ($F_1$, $F_2$, ..., $F_M$) of given duration;
    selecting, in said set of audio frames ($F_1$, $F_2$, ..., $F_M$), an audio frame (SF) representing said input audio signal (GSS);
    subdividing said selected audio frame (SF) into a set of audio sub-frames ($SBF_1$, $SBF_2$, ..., $SBF_N$) of given duration;
    determining probabilities of transition (TP) between orderly pairs of said audio sub-frames ($SBF_1$, $SBF_2$, ..., $SBF_N$);
    synthesizing said audio signal (SG) representing the dynamic state of a land vehicle by generating a sequence of said audio sub-frames ($SBF_1$, $SBF_2$, ..., $SBF_N$), each subsequent audio sub-frame (SSBF) in said sequence being selected as a function of a current audio sub-frame and of the transition probability (TP) associated thereto;
    computing a centre frequency (FCF) of a frequency spectrum of said selected audio frame (SF); and
    said operation of synthesizing said audio signal (SG) representing the dynamic state of a land vehicle further comprising carrying out a frequency shift of a centre frequency of said subsequent audio sub-frame (SSBF) as a function of said centre frequency (FCF) of the frequency spectrum of said selected audio frame (SF) and of the value of said at least one first parameter (ESP, VSP) that indicates the dynamic state of said land vehicle, thereby generating a frequency-shifted subsequent audio sub-frame (PSBF).

2. The method as set forth in claim 1, wherein said centre frequency (FCF) of the frequency spectrum of said selected audio frame (SF) is computed as a spectral centroid of the selected audio frame (SF).

3. The method as set forth in claim 1, wherein said at least one first parameter (ESP, VSP) that indicates the dynamic state of said land vehicle comprises one between an engine speed (ESP) of said land vehicle and a speed (VSP) of said land vehicle, and carrying out a frequency shift of the centre frequency of said subsequent audio sub-frame (SSBF), thereby generating a frequency-shifted subsequent audio sub-frame (PSBF), comprises:
    receiving the value of said at least one first parameter (ESP, VSP) that indicates the dynamic state of said land vehicle and determining a characteristic frequency as a function of said value of said at least one first parameter (ESP, VSP);
    determining a frequency scale factor (FSF) between said characteristic frequency and said centre frequency (FCF) of the frequency spectrum of said selected audio frame (SF); and
    applying said frequency scale factor (FSF) to the frequency spectrum of said subsequent audio sub-frame (SSBF), thereby generating a frequency-shifted subsequent audio sub-frame (PSBF).

4. The method as set forth in claim 1, wherein said at least one first parameter (ESP, VSP) that indicates the dynamic state of said land vehicle comprises one between an engine speed (ESP) of said land vehicle and a speed (VSP) of said land vehicle, and carrying out a frequency shift of the centre frequency of said subsequent audio sub-frame (SSBF), thereby generating a frequency-shifted subsequent audio sub-frame (PSBF), comprises:
    receiving the value of said at least one first parameter (ESP, VSP) that indicates the dynamic state of said land vehicle;
    associating a frequency scale factor (FSF) to said value of said at least one first parameter (ESP, VSP) as a function of a configurable map; and
    applying said frequency scale factor (FSF) to the frequency spectrum of said subsequent audio sub-frame (SSBF), thereby generating a frequency-shifted subsequent audio sub-frame (PSBF).

5. The method as set forth in claim 1, comprising applying to said frequency-shifted subsequent audio sub-frame (PSBF) at least one amplitude gain as a function of a value of a second parameter (ESP, VSP, GPP, ET, EST) that indicates the dynamic state of said land vehicle.

6. The method as set forth in claim 5, wherein said second parameter (ESP, VSP, GPP, ET, EST) that indicates the dynamic state of said land vehicle comprises at least one from among: an engine speed (ESP) of said land vehicle, a speed (VSP) of said land vehicle, a position of an accelerator pedal (GPP) of said land vehicle, an engine torque (ET) of an engine of said land vehicle, and a state (EST) of said engine of said land vehicle.

7. The method as set forth in claim 5, wherein said at least one amplitude gain is a function of the value of said second parameter (ESP, VSP, GPP, ET, EST) that indicates the dynamic state of said land vehicle according to a configurable map.

8. The method as set forth in claim 1, wherein:
    said operation of selecting, in said set of audio frames ($F_1$, $F_2$, ..., $F_M$), an audio frame (SF) representing said input audio signal (GSS) comprises computing, as a function of a values of at least one characteristic quantity computed for said input audio signal (GSS) and for each of said audio frames ($F_1$, $F_2$, ..., $F_M$), a measurement of similarity between each of said audio frames in said set of audio frames ($F_1$, $F_2$, ..., $F_M$) and said input audio signal (GSS), and selecting said selected audio frame (SF) in said set of audio frames ($F_1$, $F_2$, ..., $F_M$) as a function of said measurement of similarity between each of said audio frames ($F_1$, $F_2$, ..., $F_M$) and said input audio signal (GSS); and said operation of determining probabilities of transition (TP) between orderly pairs of said audio sub-frames ($SBF_1$, $SBF_2$, ..., $SBF_N$) comprises computing, as a function of the values of at least one characteristic quantity computed for said audio sub-frames ($SBF_1$, $SBF_2$, ..., $SBF_N$), a measurement of similarity between pairs of said audio sub-frames ($SBF_1$, $SBF_2$, ..., $SBF_N$), and determining said probabilities of transition (TP) between orderly pairs of said audio sub-frames ($SBF_1$, $SBF_2$, ..., $SBF_N$) as a function of said measurements of similarity between pairs of said audio sub-frames ($SBF_1$, $SBF_2$, ..., $SBF_N$).

9. The method as set forth in claim 1, comprising modifying spectral characteristics and/or amplitude characteristics of said audio signal (SG) representing the dynamic state of a land vehicle as a function of at least one from among a state (EST) of an engine of said land vehicle, a state of said land vehicle, conditions external to said land vehicle, a location of said land vehicle, and a schedule of use of said land vehicle.

10. The method as set forth in claim 1, comprising receiving different input audio signals (GSS) and/or selecting each subsequent audio sub-frame (SSBF) in said sequence as a function of the current audio sub-frames and of the transition probabilities (TP) associated thereto according to different rules of selection as a function of at least one from among a state (EST) of an engine of said land vehicle, a state of said land vehicle, conditions external to said land vehicle, a location of said land vehicle, and a schedule of use of said land vehicle.

11. A method for active control of sound of an engine of a land vehicle comprising using the audio signal (SG) representing the dynamic state of a land vehicle generated by applying the method as set forth in claim 1 as a driving audio signal (SG) for driving one or more acoustic actuators provided in said land vehicle so as to reproduce sound (OS) of the engine represented by said audio signal (SG).

12. An apparatus for active control of sound of a land vehicle, comprising at least one processor that generates an audio signal (SG) representing the dynamic state of said land vehicle by applying the method as set forth in claim 1 and for using said audio signal (SG) representing the dynamic state of said land vehicle as a driving audio signal (SG) for driving one or more acoustic actuators of said land vehicle so as to reproduce sound (OS) of the engine represented by said audio signal (SG).

13. The apparatus as set forth in claim 12, wherein said land vehicle comprises a plurality of acoustic actuators, and said at least one processor modulates differently said driving audio signal (SG) according to the acoustic actuator to which it is sent.

* * * * *

UNITED STATES PATENT AND TRADEMARK OFFICE
CERTIFICATE OF CORRECTION

PATENT NO. : 11,282,494 B2
APPLICATION NO. : 17/259873
DATED : March 22, 2022
INVENTOR(S) : Simona De Cesaris et al.

It is certified that error appears in the above-identified patent and that said Letters Patent is hereby corrected as shown below:

In the Claims

Column 14, Line 58 (Claim 8) delete "function of a values" and insert therefor --function of values--.

Signed and Sealed this
Seventeenth Day of October, 2023

Katherine Kelly Vidal
*Director of the United States Patent and Trademark Office*